United States Patent [19]

Yevick

[11] 4,049,756
[45] Sept. 20, 1977

[54] METHOD OF MAKING MICROFICHE LAMINATE HAVING APERTURES WITH DOUBLET LENSES

[75] Inventor: George J. Yevick, Leonia, N.J.

[73] Assignee: Izon Corporation, Stamford, Conn.

[21] Appl. No.: 622,827

[22] Filed: Oct. 16, 1975

Related U.S. Application Data

[62] Division of Ser. No. 539,458, Jan. 8, 1975.

[51] Int. Cl.[2] .................. B29D 3/00; B29D 9/10; B29D 11/00; B29F 5/00
[52] U.S. Cl. ...................................... 264/1; 29/469.5; 156/108; 264/249; 264/251; 264/259; 264/267; 264/274; 264/322
[58] Field of Search .................. 264/1, 248, 250, 254, 264/259, 267, 273, 322, 251, 274, 284, 293; 156/108, 242, 245; 40/152, 154, 158 R, 158 B; 350/175 NG, 320; 352/66, 67; 354/102; 29/527.1, 527.4, 469.5

[56] References Cited

U.S. PATENT DOCUMENTS

| 2,264,190 | 11/1941 | Sherts et al. | 428/140 |
| 2,715,089 | 8/1955 | Michener et al. | 156/108 |
| 3,173,991 | 3/1965 | Breakfield | 428/140 |
| 3,297,398 | 1/1967 | Donofrio | 156/108 |
| 3,308,225 | 3/1967 | Wells | 264/273 |
| 3,504,606 | 4/1970 | Macovski | 354/102 |

FOREIGN PATENT DOCUMENTS 641,568  8/1950  United Kingdom ............... 156/108

Primary Examiner—Willard E. Hoag
Attorney, Agent, or Firm—Thomas J. Greer, Jr.

[57] ABSTRACT

Method for making a microfiche structure consisting of a laminate of an opaque, apertured web sandwiched between two transparent sheets. The transparent material partially extends into each aperture to thereby define, for each aperture, an optical doublet. The laminate may be continuously formed by compression, as by rolls.

2 Claims, 6 Drawing Figures

METHOD OF MAKING MICROFICHE LAMINATE HAVING APERTURES WITH DOUBLET LENSES

This is a division of application Ser. No. 539,458, filed Jan. 8, 1975.

This invention relates to a microfiche and to its method of manufacture.

In my co-pending application Ser. No. 309,968, entitled "Microfiche and Reader", filed Nov. 28, 1972, (herein incorporated by reference) there is disclosed a microfiche construction, there termed a lensfiche, defined by a transparent member coated on one surface with a photographic emulsion and having on its other surface an array of integral lenses. The term lensette has been applied to such lenses because of their small size. The inter-lensette space, i.e., the space between the lenses on the non-emulsion side of the transparent member, is opaque. While such a lensette, such as illustrated at FIGS. 5, 6 and 7 of this co-pending application is satisfactory, I have now evolved a new lensfiche construction and have also evolved a novel method of manufacture.

According to the practice of this invention, a lensfiche is formed wherein each integral lensette, of the type shown in my above co-pending applications, is replaced by dual lenses, often termed doublet lenses, i.e., an optical doublet. Each such doublet is positioned generally medially of the lensfiche. The doublets are thus more or less equally spaced from both sides of the transparent member which carries them and which carries the photographic emulsion. By the use of this construction certain simplicities and certain economies in manufacture such as tolerance control may be realized. Thus, in addition to embossing or impressing a transparent plastic sheet with a die having the appropriate recesses to form the integral lensettes, I may also press transparent plastic sheets onto both sides of an apertured and opaque member, with resulting partial flow of the plastic through the apertures which thus define the optical doublet for each aperture. The same general technique may be employed to make a lensette of the type similar to that shown in my above co-pending application, namely a microfiche of the type having integral lenses on one surface and a photographic emulsion on the other surface.

IN THE DRAWINGS

Figure 1:
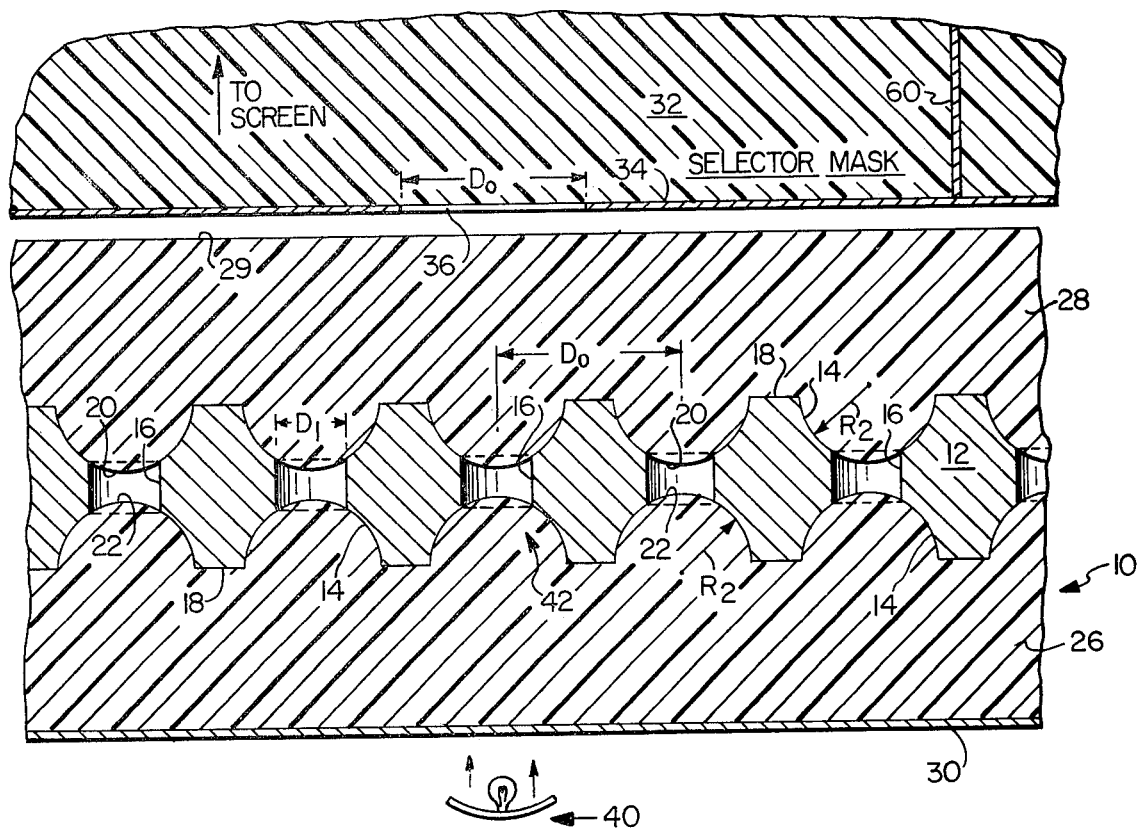
FIG. 1 is a partial cross-sectional view illustrating an integral microfiche according to one embodiment of the invention.

Referring now to FIG. 1 of the drawings, the numeral 10 denotes generally a microfiche, also termed a lensfiche because the lenses are integral with the body of the fiche. The lensfiche is identical in general structure and form to that shown in my noted co-pending application. The numeral 10 denotes generally the lensfiche and includes an opaque web 12 such as may be fashioned from aluminum provided on both surfaces with a plurality of generally semispherical recesses 14 regularly spaced to define an array over the web. The recesses 14 are pairwise vertically aligned. Apertures 16 connect the bottoms of recesses 14. The web 12 may be termed a reticulate grid. The remaining top and bottom surfaces of the grid or web 12 are denoted by the numeral 18. The numerals 20 and 22 denote curved, convex portions which extend toward each other and into the aperture 16. The numerals 26 and 28 denote plastic or other transparent material sheets with the lower sheet 26 provided with a photographic emulsion 30. Curved portions 20 are an integral part of sheet 28, while curved portions 22 are an integral part of sheet 26. The sheets may be of poly(methylmethacrylate). The diameter of the apertures 16 is denoted by $D_1$ and their rectangular spacing over the area of the microfiche denoted by $D_o$. A portion of a viewing screen, also formed of a transparent plastic, is denoted by the numeral 32 and is provided at its lower portion with an opaque coating 34 and regularly spaced apertures such as 36. Opaque septa 60, only one of which is illustrated, preclude optical cross-talk in both the taking and in the viewing process. A source of illumination schematically denoted by the numeral 40 is positioned beneath the lensfiche 10. The general arrangement of elements, namely, the lensfiche, the viewing screen, and a source of illumination, is entirely analogous to that illustrated in my noted co-pending application, and accordingly the complete assembly is not illustrated. Further, their use as either a camera or as a projector are also entirely analogous.

In operation, again as described in my noted co-pending application, microimages within the fixed or developed photographic emulsion 30 are projected by means of illumination sources 40 through these apertures 16 corresponding to a single micro scene, here along an axis denoted by the numeral 39. Light passing parallel to the indicated optic axis at 39 is refracted at the lower convex surface 22 and also at the upper convex surface 20 and passes through opening 36 to the viewing screen. Alternatively, when employed as a camera, the reverse operation takes place, with the photographic emulsion area beneath and corresponding to each doublet lens pair 20, 22 being activated. After each macro scene is either projected or photographed, the lensfiche 10 is indexed for the next operation.

The lower sheet 26 may be of the same or of a different index of refraction relative to that of the upper sheet 28. While the grid or web 12 has been described as being of metal, it will be apparent that other opaque members may be employed. It will further be apparent that the parameters $t_1$ and $t_2$ may be varied, as well as the radii $R_1$ and $R_2$.

Figure 2:
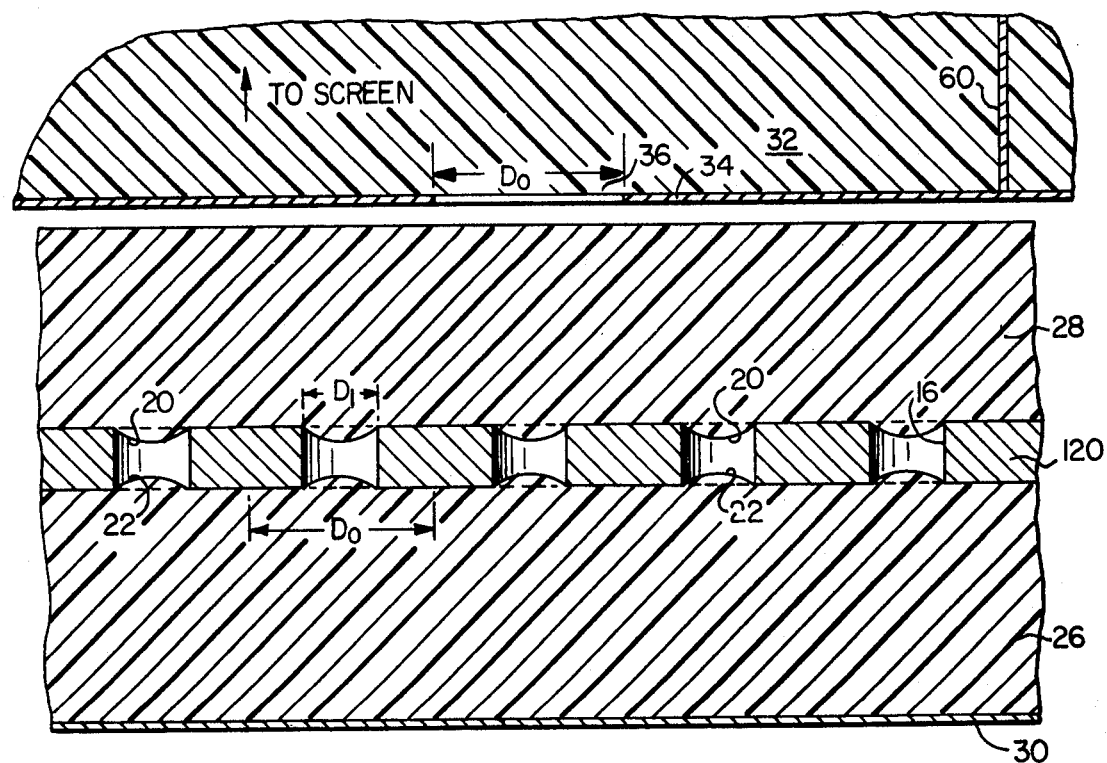
FIG. 2 is a view similar to FIG. 1 and illustrates a second embodiment of the invention.

Referring now to FIG. 2 of the drawings, another modification is illustrated which is identical in construction and in operation to the modification shown at FIG. 1, except that the web or grid member, now denoted by the numeral 120, is flat on both sides, i.e., there are no semispherical depressions 14 of radii $R_1$ and $R_2$.

As in the previously-described embodiment an optical doublet is defined by the curved portion 20 associated with the upper plastic sheet 28 and the curved portion 22 integral with the lower plastic sheet 26. The construction and operation is otherwise the same as in the embodiment of FIG. 1.

Figure 3:
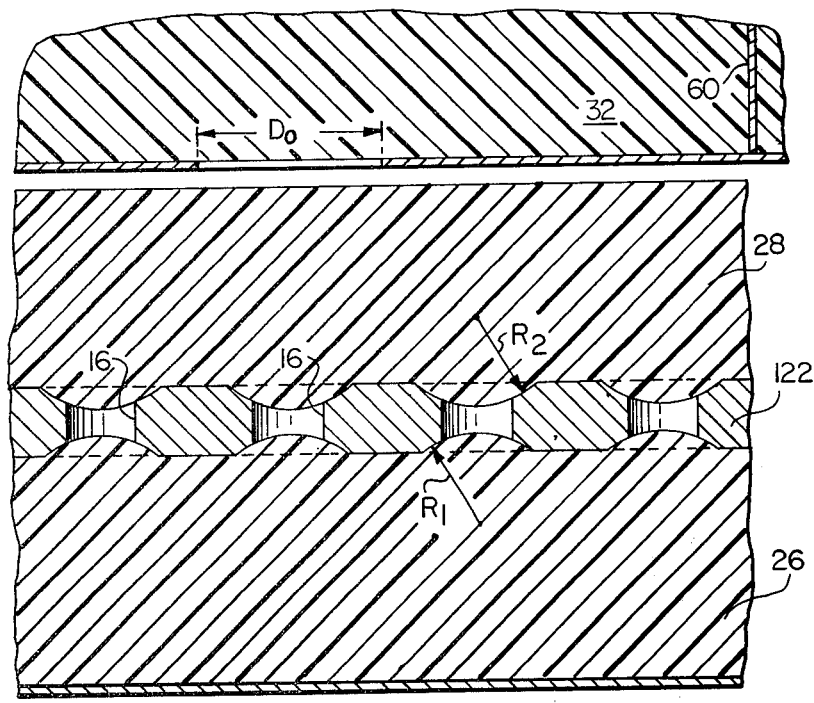
FIG. 3 is a view similar to FIG. 1 and illustrates a third embodiment of the invention.

Referring now to FIG. 3 of the drawings, still another modification is illustrated, which is similar to the embodiment of FIG. 2, except that the apertures 16 extend between chamfered portions of radii $R_1$ and $R_2$ defined by striking out associated areas above and below the apertures of the indicated radii of curvature. The chamfered portions define concavities contigious to their associated apertures 16. The web or grid is denoted in this embodiment by the numeral 122. The construction and operation is otherwise the same as in the embodiment of FIG. 1.

Figure 6:
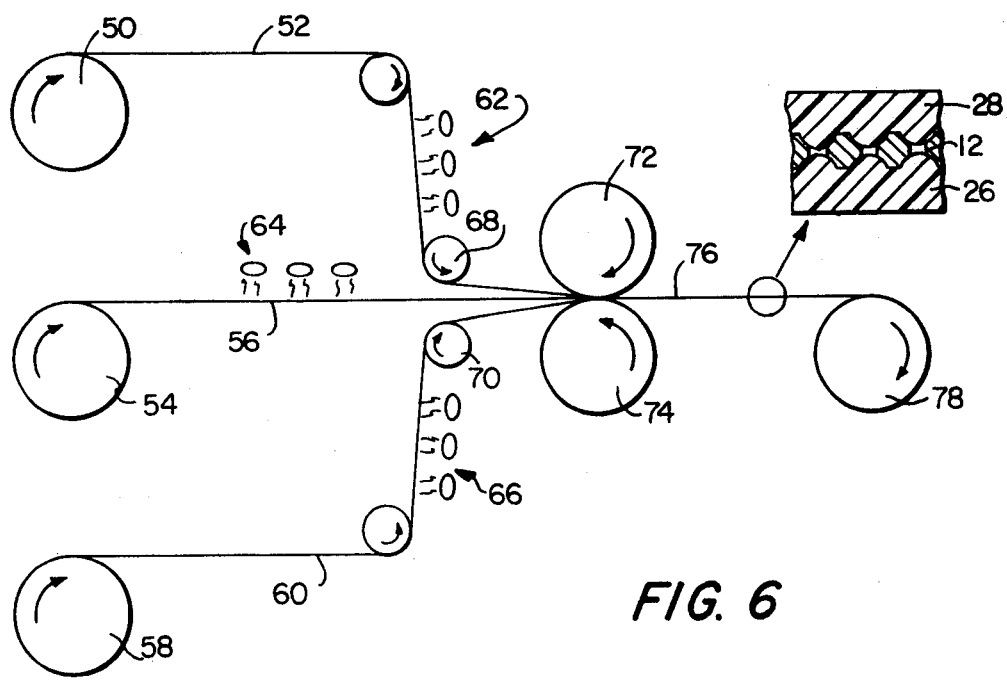
FIG. 6 is a partially schematic view illustrating a method of making any of the microfiche elements of FIGS. 1–5.

Referring now to FIG. 6 of the drawings, a method of manufacture of any of the lensfiches of FIGS. 1-3 (and FIGS. 5 and 6, to be later described) is illustrated. The numeral 50 denotes a first or upper roll of plastic or other transparent material which unwinds in the indicated direction to yield a web or sheet of indefinite lengths denoted by the numeral 52. The numeral 54 denotes a central drum or roll unwinding in the indicated direction to yield an indeterminate length web 56, the latter formed of apertured metal or other opaque substance. The numeral 58 denotes a lower drum or roll of plastic or other transparent material unwinding to yield a web 60 of indeterminate length. The numerals 62, 64, and 66 schematically denote radiant or other heating elements which transfer heat to the indicated adjacent webs. Rollers 68 and 70 may be employed to adjust the tension in the webs 52 and 60. Rollers 72 and 74 serve to press the webs 52 and 60 together, on top of and on bottom of, respectively, the intermediate grid or web 56. The resultant laminate is denoted by the numeral 76 and is wound on drum 78. Later, the drum 78 may be unwound and cut in to the desired lengths. As indicated by the exploded view of portion 67, the reader will immediately understand that the upper web 52 defines the upper transparent plastic mass or sheet 28 of any of the lensfiches of FIGS. 1-5 while the lower web 60 defines the lower plastic mass or sheet 26. The intermediate web 56 defines the web or grid 12, 120, or 122. Upon heating by the indicated heating elements, the plastic material becomes more readily deformable and flowable. By proper adjustment of the temperature and the tension in the webs and the pressure at the nip of rolls 72 and 74, the reader will readily understand that plastic is partially forced into the apertures 16 to thereby define curved, convex portions 20 and 22. These latter portions define optical doublets. Thus, referring to FIG. 1, the surface 20 in combination with the upper planar surface 29 of plastic mass 28 defines a first plano-convex lens while lower curved portion 22 in combination with its associated flat portion of plastic mass 26 adjacent emulsion 30 defines a second plano-convex lens.

The openings 16 may be etched on the web 12 in the case of a metal. In the case of aluminum for example such techniques are well known. For the embodiment of FIG. 1, the aluminum sheet may be passed through embossing rolls (not illustrated) to generate the depressions 14 having radii of curvature $R_1$ and $R_2$. It will also be apparent that instead of forming the convex portions 20 and 22 of any of the embodiments by the means described above, such convex portions may be preformed or pre-embossed on the webs 52 and 60, with the structure shown at FIG. 6 employed merely to assemble or laminate them with the intermediate and metallic grid portion.

Should the diameter $D_1$ of the aperture 16 shrink to a value approximating $2 t_1$ lambda, where lambda is, for example, 5500 A, the system of any of the embodiments of FIGS. 1-6 would then define a pinhole lensfiche such as described in my co-pending patent application Ser. No. 474,795, entitled "Pinhole Microfiche Camera", filed May 30, 1974, here incorporated by reference.

The reader will recognize that the apertures 16 define an aperture stop positioned midway between the two curved surfaces. Aperture stops are well-known in optics. The illustrated mid-thickness location is by far the best position or location for such a stop. The position of the aperture stop midway of the curved surfaces 20 and 22 displays the additional advantage of providing a degree of symmetry between the two halves of the optical system. Such an advantage is well known in the theory of the Stanhope magnifier, and, the combination of the curved surfaces 20, 22 in their position relative to the aperture 16 may be regarded as a minature Stanhope magnifier.

By selecting the radii of curvature $R_1$, $R_2$ properly, chromatic aberration may be corrected as follows. Let B stand for a blue wavelength and let R stand for a red wavelength. Then the focal length of the lensettes for the blue light is given by:

$$1/f_b = (n_{1B}-1) 1/F + (n_{2B}-1) 1/R_2$$

For the red wavelength the new focal length becomes $$1/f_R = (N_{1R}-1) 1/F + (n_{2B}-1) 1/R_2$$

In order to correct for the difference in focal lengths due to the index of refraction variation of the plastic, the two focal lengths are equated, i.e., $$(n_{1B}-1) 1/R_1 + (N_{2B}-1) 1/R_2 = (n_{1R}+1 1/R_1 + (n_{2R}-1) 1/R_2$$

The above expression yields a unique relationship between $R_1$ and $R_2$ knowing $n_{1B}$, $N_{1R}$, $N_{2B}$, $N_{2R}$ $$R_1 = [-(n_{1B} - n_{1R})/(n_{2r} - n_{2B})] R_2$$

and thereby the doublet lenslet is corrected for chromatic aberrations.

While in general, the temperature of webs 52 and 60 are the same, the radii of curvature of surfaces 20 and 22 may be varied by having the temperature of webs 52 and 60 different. For example, different temperature will necessarily partially define the flow rate and hence the amount of plastic entering into the apertures 16 and thus the convexity or curvature of surfaces 20 and 22. Preferably, in order that the co-efficient of thermal expansion of the web 12 be the same as that of sheets 26 and 28, aluminum may be employed as the web and a polyester as the plastic. It will also be apparent that the photographic emulsion 30 may be applied to the web 60 at FIG. 4 at any point in the process, preferably after passing the nip of rolls 72 and 74. Alternatively, the emulsion may be applied after the laminate is unwound from roll 78.

Figure 4:
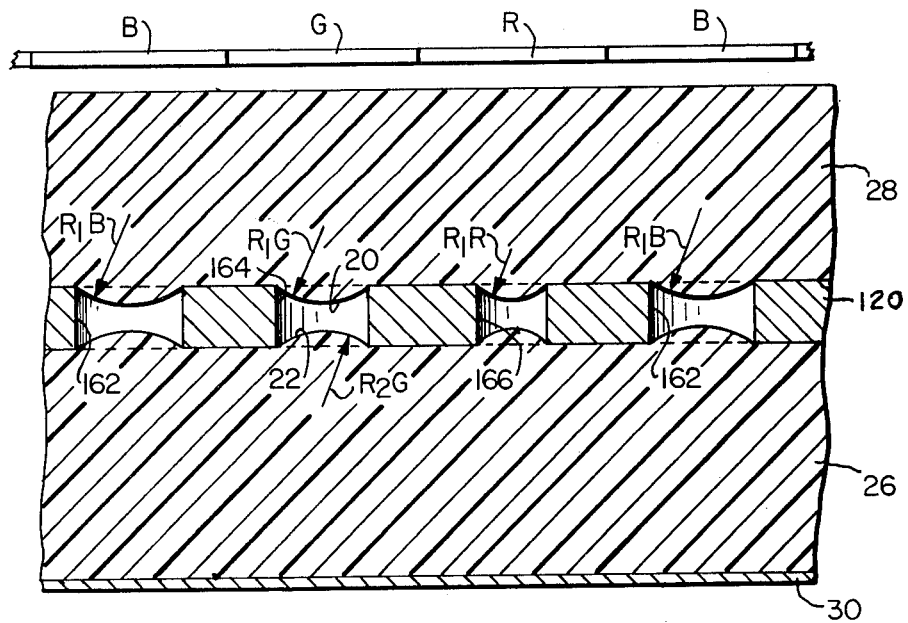
FIG. 4 is a view similar to FIG. 1 and illustrates another embodiment.

Referring now to FIG. 4 of the drawings, an embodiment is illustrated similar to that of FIG. 2, except that each optical doublet is adapted to accommodate only a single color to thereby permit the use of black and white emulsion for the taking and for the projection of color macro scenes. The use of black and white emulsion for the photographing and for the projection of color macro scenes is described in my U.S. Pat. No. 3,824,609, dated July 16, 1974, the teachings of which are hereby incorporated by references. The apertures 162, 164, 166 are of different diameters. The apertures of one sub-set have the diameter of aperture 162, the second sub-set apertures have the diameter of aperture 164, the third sub-set apertures have the diameter of aperture 166 (the three sub-sets defining the entire set of apertures). As shown in that patent, each lensette of each triad of lensettes accommodates so to speak a single primary color, such as blue or red or green. If all light of these three wavelengths is to be focused on equal distance from the lensettes, i.e., focus on the photographic emulsion, some method must be evolved which will compensate for the fact that these different wavelengths undergo different amounts of refraction. Otherwise, they would focus at different distances from the lensettes. In order to accomplish this I make different the radii of curvature for each optical doublet (in each color triad). Reference now to FIG. 4 will make plain this construction. If light of the three primary colors red, green, and blue is incident on the top of the lensfiche at FIG. 4, then in association with color filters such as shown in my U.S. Pat. No. 3,824,609, these wavelengths will all be focused on emulsion 30 if their associated optical doublets are properly configured. Such a condition is realized if the following is met:

$$\frac{1}{f_R} = \frac{1}{f_G} = \frac{1}{f_B} \quad (f = \text{focal length}) \tag{1}$$

This condition may be met if the equation is rewritten in the following form, wherein the subscript 1 refers to the top radii 20 and wherein subscript 2 refers to the bottom radii 22.

$$(n(\lambda_B) - 1)(\frac{1}{R_{1B}} - \frac{1}{R_{2B}}) = (N(\lambda_G) - 1)(\frac{1}{R_{1G}} - \frac{1}{R_{2G}}) \tag{2}$$

$$= (N(\lambda_R) - 1)(\frac{1}{R_{1R}} - \frac{1}{R_{2R}})$$

For the simple symmetric case of $$|R_{1B}| = |R_{2B}| \text{ and } |R_{1G}| = |R_{2G}| \text{ and } |R_{1R}| = |R_{2R}|,$$

$$(n(\lambda_B) - 1)\frac{2}{R_{1B}} = (n(\lambda_G) - 1)\frac{2}{R_{1G}} = (n(\lambda_R))(\frac{1}{R_{1R}})$$

These last equations uniquely determine the relationship between $R_{1B}$, $R_{1G}$ and $R_{1R}$ knowing $n(\lambda_B)$, $n(\lambda_G)$ and $n(\lambda_R)$. Since in general $n(\lambda_B) > n(\lambda_B) > n(\lambda_R)$, $R_{1B}$ must be greater than $R_{1G}$ which in turn is greater than $R_{1R}$, i.e., $R_{1B} > R_{1G} > R_{1R}$.

FIG. 4 has shown, for convenience, the elements of a triad of lensettes as positioned in a single row. This need not always be the case, as may be seen by reference to FIG. 1 of my U.S. Pat. No. 3,824,609. While three sub-sets define the "color" microfiche of FIG. 4, the member of sub-sets may be two (for two colors) or four (for four colors), or, in general, N.

Figure 5:
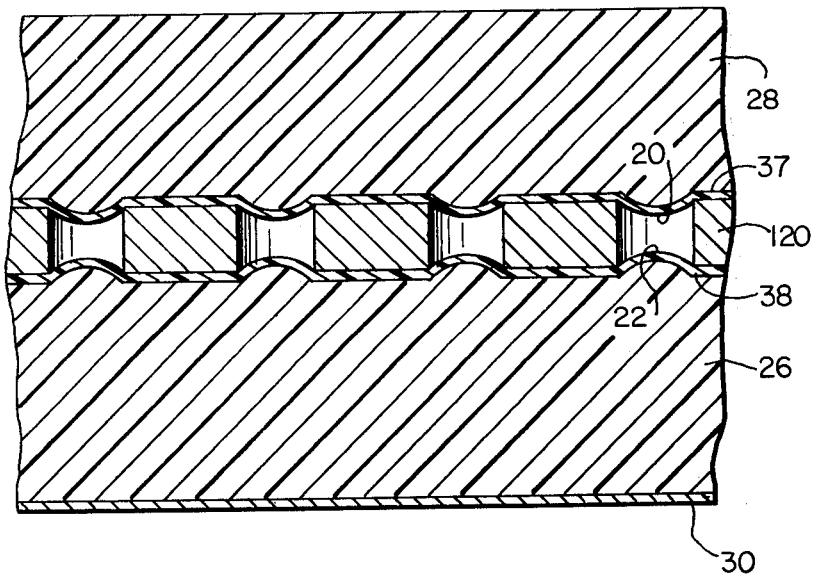
FIG. 5 is a view similar to FIG. 1 and illustrates another embodiment.

The above description has treated the case wherein the convex portions 20 and 22 are either preformed and sandwiched to the central opaque and apertured web, or alternatively, these convex portions have been formed during the lamination process by plastic flow of the transparent material partially into the web apertures 16. In this latter method of construction, it may be convenient for the purpose of more accurately controlling the operation to place a relatively thin plastic sheet over both sides of the apertured web. Such a sheet is of a thickness, for example, of ½ mil and is applied to the web prior to the lamination. Such a sheet functions as a cushioning agent. This is illustrated at FIG. 5 of the drawings.

I claim:
1. In a method of forming a microfiche laminate having an apertured opaque sheet with facing plano-convex lenses forming a doublet lens in at least one through aperture of said sheet, the steps comprising: forming opposite concavities on opposite sides of an apertured opaque sheet, two of said opposite concavities being contiguous to at least one aperture; disposing transparent thermoplastic sheet material on said opposite sides of said apertured sheet; applying heat and pressure to said thermoplastic material on said opposite sides causing said material to flow into said concavities and only partially into said apertures to form said facing plano-convex lenses.

2. The method of claim 1 wherein said opaque sheet is metal.

* * * * *